(No Model.)
J. M. DUNCAN.
MANUFACTURE OF SALT.
No. 321,347. Patented June 30, 1885.
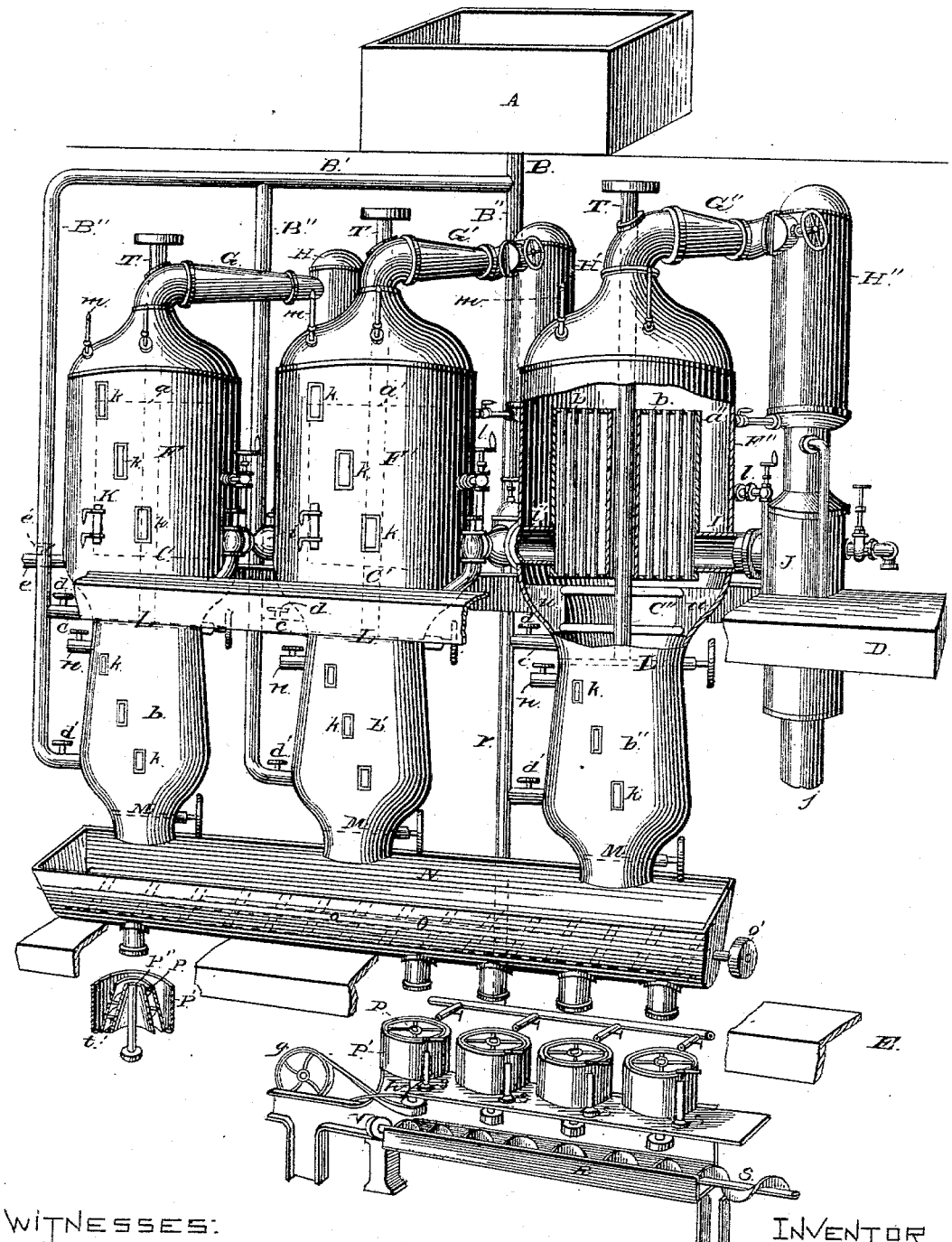
WITNESSES:
Norris R. Clark.
Geo. H. Cooper Jr.
INVENTOR
Joseph Myers Duncan
by Geo. W. Dyer
Atty.

UNITED STATES PATENT OFFICE.

JOSEPH MYERS DUNCAN, OF WARSAW, NEW YORK.

MANUFACTURE OF SALT.

SPECIFICATION forming part of Letters Patent No. 321,347, dated June 30, 1885.

Application filed December 24, 1884. (No model.)

*To all whom it may concern:*

Be it known that I, JOSEPH M. DUNCAN, of Warsaw, in the county of Wyoming and State of New York, have invented a new and useful Improvement in the Manufacture of Salt; and I do hereby declare that the following is a full and exact description of the same, reference being had to the accompanying drawing, and to the letters of reference marked thereon.

In the methods now in common use for the manufacture of salt from the brine of salt-wells in open pans or in kettles or in steam-grainers, after the salt has been separated, it is exposed on draining-floors for two weeks or longer, in order to have the salt in proper condition for shipment. In these methods of manufacture, where the heat is directly applied to the outer surfaces of the pans or kettles or in pipes within the grainers, there is a great waste of the heat, and consequently great expense in fuel, and from reasons well understood, by the intrusion of dirt and smoke and the accumulation of chlorides in the vessel, the manufacture is not cleanly or pure, and thereby the quality of the salt is affected injuriously. In the modes of manufacture referred to there is a constant accession of brine into the pans, kettles, or grainers, and a constant drawing off of the salt, and a cleaning out of such vessels necessitates the entire stoppage of the work of evaporation. In cold weather the vapor of evaporation is a source of great annoyance to the workmen, and in condensing falls back upon the salt after it is drawn from the vessels named and discolors it, and in addition the heat contained in these vapors is wholly lost. Besides, in the modes referred to the salt is shoveled two or three times before it gets into the casks for shipment, thereby exposing it to further discoloration from dust, &c. Besides, these modes of manufacture referred to require a large extent of ground for the various buildings and plant and large and expensive buildings, and both buildings and plant require frequent and large repairs.

My improvements are in the direction of economy in manufacture, and cleanliness and purity in the salt as manufactured. One economy is in the fuel required, which is very much less in my method of manufacture, and in the expense of ground and buildings and plant for manufacture, which is very much less than in the modes now practiced, and in the product of salt, which is very much greater in proportion to the fuel than in any of the modes now in use, and the resultant salt is much cleaner and more pure than is now ordinarily obtained.

My improvements are also in the direction of avoiding the various defects, before referred to, as existing in the present modes of manufacture, as will be more specifically hereinafter pointed out.

The novelty in my invention consists in the apparatus, as will be more specifically pointed out and embodied in the claims, and for its better comprehension attention is invited to the accompanying drawing, which shows an elevation of my apparatus, broken away in portions for better illustration.

The apparatus as illustrated and as intended for use, while connected together, extends through several floors in a proper building, and, commencing at the top, has a brine-tank, A, into which brine is constantly pumped. From this tank, by means of a pipe, B, and branch and connecting pipes B' and B'', the brine descends by gravity into the vessels C, C', and C'', the upper part of each marked, respectively, $a$, $a'$, and $a''$, and the lower parts marked, respectively, $b$, $b'$, and $b''$, and the parts $a\ a'\ a''$ preferably being arranged on the floor D next below the floor where the tank A is placed, and the parts $b\ b'\ b''$ being preferably near the floor E next below the floor D. The pipes B'' enter the parts $a\ a'\ a''$ near the bottom thereof, preferably by short branch pipes $c$, each having a proper cut-off valve, $d$, while the same pipes B'' enter the parts $b\ b'\ b''$ near the bottoms thereof and have also cut-off valves $d'$. The vessels C C' C'' are made of suitable metal, preferably of the form shown, and the vessel C is adapted to take steam into the upper part, $a$—either live steam or exhaust—from a suitable source of supply, through a pipe, $e$, with a suitable valve, $e'$, which pipe enters a drum, F, placed centrally within such upper part and provided with proper flue-pipes, $f$, except in the center, where there is a clear open space, $g$, the ends of such flues and opening being sustained in top and bottom plates, which extend entirely across the vessel and are secured to the inner walls thereof. The steam, entering this drum, passes around such flues, heating them and the drum, the brine filling such flues and the central space, $f$, and the entire space in the vessel below the drum and a portion of the vessel above the drum, the flues and the central space not only promoting evaporation by heating the brine, but by the excess of heat at certain points creating a constant circulation of the brine. The steam within this drum F causes the brine through and over and under the drum and throughout the lower part, $b$, of the vessel C in the vessel to boil violently, and as the steam condenses it is drawn out of the drum by a pipe. (Not shown.) As the brine in the vessel $a$ C, referred to, is caused to boil violently by means of the steam, as described, its vapor rises and passes through the pipe G at its top into the cylinder H, from which it passes by a branch pipe, $i$, near its bottom, into the vessel $a'$ C' and into a drum, F', within said vessel, constructed and arranged like the drum F. This hot vapor in the drum F', causes the brine in this vessel also to boil, and as the work of this vapor is effected it is drawn out in a pipe. (Not shown.) The brine in this vessel, boiling, discharges vapor, which passes out of its top through the pipe G' into the cylinder H', from which it passes by a branch pipe, $i'$, near its bottom into the vessel $a''$ C'' and into a drum, F'', within such vessel, constructed and arranged like the drum F, and causes the brine in this vessel to boil. Having done its work, this vapor is drawn off through the pipe G' into the cylinder H'', and thence into the main exhaust-pipe I, which is tapped into a chamber, J, which is connected with any suitable vacuum-pump (not shown) by the pipe $j$. The vessels $a$ C $a'$ C' $a''$ C'' have preferably glass-covered peep-holes $k$, so that the condition of the brine may be inspected. Each vessel is also provided with a test-tube, K, and a valve, $l$, connected with a draw-off pipe, for taking off the surplus of the water of condensation in the drum F and of the water of condensation from the vapors in the other vessels, and also with air-valves $m$ to allow the air to escape in creating a vacuum.

Connected with and making a part of the vessels $a$ C $a'$ C' $a''$ C'', are the lower portions thereof, $b$ C $b'$ C' $b''$ C'', constructed preferably of less diameter than the parts named above, but expanded a little at the center and drawn in at the bottom a little, as shown. A valve, L, is adapted to completely close the top of these lower portions and to shut off communication with the chambers above them when the salt is to be drawn off, but to remain open during the act of evaporation. The office of these lower portions is to receive, in the first instance, the main supply of brine, and when evaporation has been perfected in the chamber above and the valve L opened to receive the salt it allows the brine displaced by the salt to fill the chamber above, and thus the vacuum in the vessels C C' C'' is practically maintained, and the line of the brine in such vessels C C' C'' is also practically maintained at a point a little above the tops of the drums F F' F''.

The branch pipes B and B', before mentioned, leading into the bottom of the chambers $a$ $a'$ $a''$ are used mainly to keep the supply of brine uniform in the evaporators whenever it falls below the proper line. Each of these vessels $b$ C $b'$ C' $b''$ C'' is provided with a valve-pipe, $n$, for the purpose of discharging the air in filling with brine and for admitting air to destroy the vacuum, in order to discharge the salt from such vessels, each having a valve, M, closing its bottom to retain its contents and opening to discharge the salt. Directly below the bottoms of these vessels C C' C'' is placed a mixer, N, preferably supported on the floor E, into which the salt falls from said vessels, and in which it is agitated by a stirrer, O, having a shaft, $o$, and pulley $o'$, adapted to be driven by applied power, and this agitation serves to keep the salt broken up, and prevents its caking or adherence to the walls of the mixer. From the mixer the salt falls by gravity into the inner centrifugal baskets, P, supported over a conveyer-box, hereinafter mentioned, which preferably rests on the lower floor of the building, (of which baskets four are shown, but which should be in sufficient number to receive all the salt which drops from the mixer.) These baskets P are inclosed in an outer shell, P', and are revolved by shafts $p$, connected with them, which shafts are driven by pulleys, to which power is applied, preferably, by belting from a pulley, $q$, driven by suitable power. As these baskets revolve, a supply of fresh brine from the tank A, by means of the pipe B'' and suitable branch pipes, $r$, passing through the salt in these baskets P, thoroughly washes it and removes all chlorides and foreign matter. The brine which passes out through the perforations in the walls of such baskets into the space between them and the outer shell, P', may be drawn off by suitable pipes and forced back into the tank A, if desired, or allowed to escape and go to waste, or run into a separate vessel and treated with chemicals to remove the chlorides. These baskets P have valves $s$ in their bottoms, through which the salt is discharged into a conveyer-box, R.

Instead of the centrifugal baskets or shells P P', as described, I may use a centrifugal which will be capable of continuous feed and continuous discharge. Such is shown, in Fig. 2, composed of an outside stationary shell, P', to hold the water, and an inner revolving basket, P, of a conical form, with perforations, and inside of that a revolving cone, P'', with spiral wings $t$ revolving independently in the same direction, but at a different speed from that of the basket, and, by the action of the spiral wings $t$, preventing the salt from falling too rapidly out of the basket P.

It is evident that by regulating the speed of revolution named the salt may be retained in the baskets a longer or shorter time, as desired. The brine used for washing the salt in these centrifugals may be treated with sal-soda in a way well known. In this way the salt, continuously fed in, is constantly washed, and as constantly delivered into the conveyer-box R. A suitable conveyer, S, in this box, driven by a pulley, v, draws out the salt, thus crystallized, washed, and cleaned and purified, into the barrels or other vessels of transportation. By the various appliances connected with these vessels C C' C'' the operator is enabled to so control the heat applied that it may be so high as to produce the finest table-salt, or so low and slow in action as to produce the coarsest salt, and, in fact, to produce a salt of different degrees of coarseness in the different evaporators.

These vessels C C' C'', it is evident, may be so used—as, for instance, with weak brine—that while evaporation is going on in such vessels, consecutively, the crystallization into salt may be effected in only one or two of them.

For the removal of salt which might cake upon the walls of the lower part of the chambers a a' a'' of the vessels C C' C'', I have provided a central vertical shaft, T, provided with scraping-arms u, which shaft extends above the vessels C C' C'', and is adapted to be rotated by a pulley connected with suitable power.

While I have described three of the evaporators and receivers, coupled and acting together, it is apparent that a greater or less number may frequently be used to advantage; and while I have described particular constructions of various portions of my apparatus, it is evident that a skillful mechanic might change these constructions without departing from my invention.

In the operation of my apparatus, the brine being let into the chambers b b' b'' so as to fill both compartments to a point above the drums F F' F'', which line of filling is to be preserved pretty nearly by the use of the branch pipes e, as before explained, and steam applied and the work of evaporation in progress, the salt, as it crystallizes, being heavier than the brine, falls by gravity to the bottoms of the chambers b b' b'', being replaced by other brine, in the constant circulation going on in these vessels, and therefore the heat is applied at all times to brine of nearly uniform density, and the work of evaporation is uniform as well as constant. When, by inspection through the peep-holes k, a sufficient quantity of salt has been deposited in either of the chambers b b' b'', the feed-pipes and the valve L are closed and the valves m and n are opened, allowing the salt to fall by gravity into the mixer.

Some of the advantages of my apparatus may be stated as follows: By grouping the several parts of my apparatus, one above the other, the whole organization is very compact, and may be contained in a single building of no very great size, instead of requiring, as in the present methods, numerous buildings scattered over acres of ground, with a much less capacity for production than would be afforded by my apparatus, and thus there would be a great saving in the expense of ground and of buildings. The apparatus itself, composed of few parts as compared with those now employed, and subjected to less violent heats, will be cheaper of first cost and of maintenance than those now employed. By reason of the use of the evaporating heat, in the first instance in the form of steam and subsequently in the form of heated vapors produced by the first employment of the steam-heat, there results no waste of the heating-power of the fuel; but it is all utilized to the greatest possible extent. Finally, the manufacture is absolutely cleanly, and the resultant product will not only be clear and pure salt, but will in a single series of operations produced in the same apparatus within a single building convert the brine into commercial salt of various degrees of fineness, fit for the various demands of the trade.

Having thus explained my improvement and enumerated some of its advantages, what I claim as new therein, and desire to secure by Letters Patent, is as follows:

1. An apparatus for manufacturing salt, wherein the brine receiving and evaporating vessels are arranged directly above the mixer, and the mixer directly above the washers, substantially as described.

2. The vessels C C' C'', for receiving and evaporating brine, composed of upper and lower chambers, each adapted for receiving and evaporating brine and divided by a valve, as described.

3. The vessels C C' C'', for receiving and evaporating brine, composed of upper and lower chambers, and combined with brine-feed pipes tapped into each chamber, substantially as described.

4. The vessel C, for receiving and evaporating brine, composed of upper and lower chambers, and combined with brine-feed pipes and steam-supply pipe, substantially as described.

5. The vessel C, for receiving and evaporating brine, composed of upper and lower chambers, and combined with brine-feed pipes tapped into each chamber, a steam-supply pipe, and an exhaust-pipe, substantially as described.

6. In an apparatus for manufacturing salt, the combination of the series of receiving and evaporating vessels C C' C'', composed of upper and lower chambers, the first in the series supplied with a steam-pipe, and each supplied with brine-feed pipes tapped into each upper and lower chamber and connected together by the intermediate pipes, G G' G'', and cylinders H, H', and H'', with the exhaust J, substantially as described.

7. The combination of the vessels C C' C'', for receiving and evaporating brine, composed of upper and lower chambers provided with the valves L and M, and with brine-feed pipes tapped into each chamber, an air-supply pipe, $n$, and a mixer, N, placed immediately below said vessels, substantially as described.

8. The combination of the vessels C C' C'', for receiving and evaporating brine, composed of upper and lower chambers provided with the valves L and M, brine-feed pipes tapped into each chamber, an air-supply pipe, $n$, a mixer, N, and washers P P', arranged one directly above the other, substantially as described.

9. In combination with the vessels C C' C'', for receiving and evaporating brine, composed of upper and lower chambers, revolving scrapers arranged at the bottom of said upper chambers, substantially as and for the purposes set forth.

10. In combination with salt-making apparatus, the centrifugal baskets P, each inclosed in an outer shell, P', and provided with shafts $p$, and driven together by a single belt, substantially as described.

In testimony whereof I affix my signature in presence of two witnesses.

JOSEPH MYERS DUNCAN.

Witnesses:
JNO. C. SCHROEDER,
GEO. H. COOPER, Jr.